United States Patent [19]

Popp

[11] 4,068,206
[45] Jan. 10, 1978

[54] PRESSURE-SENSING SEMICONDUCTOR TRANSDUCER

[75] Inventor: Roger C. Popp, Chesaning, Mich.

[73] Assignee: Midland-Ross Corporation, Cleveland, Ohio

[21] Appl. No.: 699,897

[22] Filed: June 25, 1976

[51] Int. Cl.² ............................................ H01L 10/10
[52] U.S. Cl. ........................................ 338/36; 73/727; 338/4; 338/50
[58] Field of Search .................... 338/36, 4, 5, 47, 50; 73/398 AR

[56] References Cited

U.S. PATENT DOCUMENTS

| 3,389,362 | 6/1968 | McLellan | 73/398 AR X |
| 3,587,322 | 6/1971 | Lobdell et al. | 73/398 AR X |
| 3,899,766 | 8/1975 | Mermelstein | 338/4 X |

Primary Examiner—C. L. Albritton

Attorney, Agent, or Firm—Woodrow W. Portz

[57] ABSTRACT

Disclosed is a pressure-sensing transducer in which a transducing unit comprising a semiconductor-type strain element is confined within a housing defining a generally funnel-shaped chamber. The unit is supported within the housing in spaced relationship with the surface of the chamber by an electrically non-conductive cup-shaped member of relatively rigid material, and a resilient electrically non-conductive ring which is yieldably deformed by sealing engagement of outer peripheral surface portions of the ring with the chamber and the inner cup surface of the member, and the inner periphery of the ring with the outer circular surface of the unit. A viscous flow-resistant, electrically non-conductive liquid occupies any open space in the chamber for communicating pressure from a pressure source through the small end of the chamber to the element within the unit.

7 Claims, 4 Drawing Figures

PRESSURE-SENSING SEMICONDUCTOR TRANSDUCER

BACKGROUND OF THE INVENTION

In adapting pressure-sensing transducers for use in, e.g., a vehicle-brake control system, it is desirable to incorporate into the electrical portion of this system a commercially available strain element assembly usually comprising a silicon chip carrying a piezo resistive strain sensitive bridge and other circuit elements. Such an assembly is typified by a pressure transducer manufactured by the National Semiconductor Corp. of Santa Clara, California, and identified as series LX1450A/SZ32645. A transducer of the latter series utilizes a small cylindrical metal shell of 5/16 of an inch in diameter which encases the strain element assembly. Such a transducer provides an electrical output that is proportional to the hydraulic pressure, such as that resulting from vehicle brake pedal effort, applied to the strain element. The electrical signal produced in this manner is amplified and transduced into proportional brake operation by known techniques.

The main object of the invention is to provide an improved transducer of simplified trouble-free design with a low manufacturing cost. Another object is to enable the transducer to be constructed with a thin housing of high strength material, such as metal, and to provide suitable construction for electrically insulating the housing from the circuit-carrying elements of the transducer. It is another object to utilize metal as the outer casing of the transducer in order that permanently crimped portions may be formed and utilized in the assembling of the transducer.

SUMMARY OF THE INVENTION

According to the invention, a transducer capable of proportionally translating variations of hydraulic pressure into a corresponding varying electrical signal is constructed in a special manner to house a transducer unit. This unit is of known design and typically comprises a casing enclosing a semiconducting material, such as silicon chip, with the appropriate electrical circuitry incorporated thereon. The casing is apertured at one end to allow fluid communication with one side of the chip and extension of conductors from the other side of the chip exteriorly of the other end of the casing.

In order to support the unit, the transducer comprises a housing constructed along one portion to connect with a pressure supply duct and along another portion to provide a generally funnel-shaped chamber having one larger open end adjacent to an end of the housing and its other smaller end interiorly of the housing with the chamber in general concentricity to an axis. A passageway of relatively small diameter extends from the small end of the chamber into the portion of the housing connected with a pressure source. The transducer further comprises a cup member of non-conducting material having an outer peripheral surface which conforms to a substantial surface portion of the chamber adjacent its larger end and defines a central cup-shaped cavity opening toward the small end of the chamber and extending away therefrom to the bottom of the cavity on which the transducer unit is seated.

In seated position, the transducer unit extends outwardly of the cavity at clearance with any side surface of both the cavity and the chamber. A ring of resilient material encircles the unit with its inner surface in sealed frictional engagement with the outer surface of the unit, and the outer annular surface portions of the ring and unit in resilient sealed engagement with the annular surface portions of the chamber and the cavity to confine the ring in a fixed axial position.

In a preferred embodiment, a viscous flow-resistant electrically non-conductive liquid fills the passageway and any portion of the chamber contiguous therewith not occupied by the unit and the rings. Circuit connectors extending outwardly of the unit extend through the member and outwardly from said opening end. The various interior components of the transducer when positioned as above described, are secured into place by means, such as an annular crimped portion of the housing extending in turned over position against an end surface of the member.

DESCRIPTION OF THE PREFERRED EMBODIMENT

Figure 1:
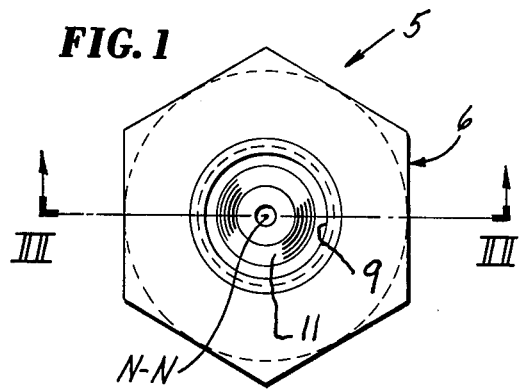
FIG. 1 is an end view at the pressure applying end of a transducer in accordance with the invention shown also in FIGS. 2 and 3.
Figure 2:
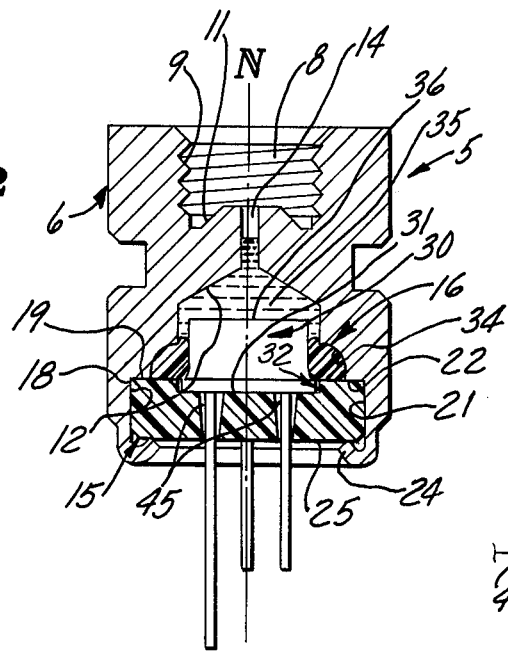
FIG. 2 is a view in section taken along the axis of the transducer in accordance with line II—II of FIG. 1.
Figure 3:
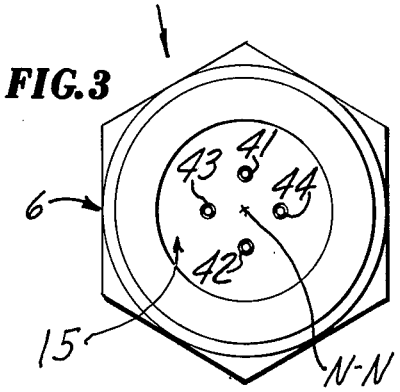
FIG. 3 is an end view of the transducer of FIGS. 1 and 2 taken at the end at which electrical conductors enter the transducer.

Shown in FIGS. 1, 2 and 3 is a transducer 5 having a generally hexagonal housing 6 constructed with its various internal and external surfaces in generally concentric relation with an axis N—N. The housing has a pressure-fluid receiving port 8 which may be defined by an interiorly threaded surface 9 and a frusto-conical seat surface 11, as shown, adapting the housing to receive a conventional flared tube end and threaded bushing type of tube connection through which hydraulic pressure may be transmitted to a semiconductor element of the transducer.

The housing 6 defines an internal generally funnel-shaped chamber 12 in concentric relation with axis N—N and in coaxial relation with the port 8. A passageway 14 of relatively small diameter, such as on the order of 0.04 of an inch, extends concentrically along the axis N—N and connects the small end of the chamber 12 with the port 8.

The transducer further comprises a cup-shaped member 15 and a resilient ring 16 which, in undeformed condition, is an O ring of rubber or rubber-like material. As evident from FIG. 2, the cup member 15 has an outer peripheral surface comprising a cylindrical surface portion 18 and a radially extending surface 19 which conform to a substantial surface portion of the chamber 12 adjacent its large end. In the form shown, the casing provides a cylindrical internal surface 21 and a surface 22 contiguous therewith in a radial plane which are in confronting relation with, and mate with surfaces 18, 19, respectively, of the cup member to positively position both radially and axially the cup member within the housing 6 when an inturned crimped edge 24 of the housing is folded inwardly against the end surface 25 of the member. The member 15, formed of an electrically non-conducting non-resilient material, is effectively entrapped from movement in any direction within the housing.

To preliminarily position the components received by the housing, a transducer unit 30 is seated on the bottom surface of a central cup-shaped cavity 32 defined by the member 15. The cavity extends inwardly of the member 15 away from the small end of the chamber 12. Thereafter, the ring 16 may be placed around the outer cylindrical surface of the unit 30, this assembly of three components may then be inserted into the chamber 12 to seat approximately as shown. A heretofore cylindrical edge portion of the housing is turned inwardly by well known tooling to form the crimped edge 24 which causes such positive seating of the member 15 within the housing and deformation of the ring 16 as to effect sealed contact of the ring with the outer cylindrical surface of unit 30 and an interior surface portion 34 of the housing within the chamber 12. The transducer 5 is now assembled and sealed in such a manner as to prevent any leakage of fluid from the open region 35 contiguous with the end surface of the unit 30.

Figure 4:
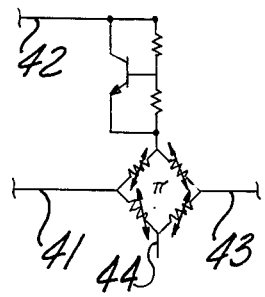
FIG. 4 is a diagram of the portion of the electrical circuitry carried on a semiconducting element of a semiconductor unit supported in the transducer.

Fluid at different levels of pressure normally fills the region 35, the passageway 14 and the port 8. Air entrapped in any of this space is extremely detrimental to the operation of a control system responsive to the transducer 5. In the space comprising region 35 and the passageway 14 at least, the transducer preferably contains a flow-resistant, electrically non-conductive liquid substantially immiscible with respect to mineral or petroleum-type hydraulic oils capable of functioning at a very wide range of atmospheric temperatures, such as a silicone fluid. Such a fluid may be introduced into the transducer by subjecting the assembled transducer to an extremely high vacuum and then feeding the flow-resistant, electrically non-conductive fluid into port 8 under a moderate amount of pressure. Because of the extremely small amount of displacement of fluid which occurs during operation of the transducer, the fluid or other flow-resistant, electrically non-conductive fluid will remain permanently within the region 35 and the passageway 14. The electrical connectors 41 to 44 of the unit 30 extend outwardly of the transducer through apertures 45 therefor through the member 15. The conductors are portions of the electrical circuitry carried on a semiconductor element (not shown) within the unit 30. In accordance with known technology dealing with semiconductors, such as silicon crystals, an example of the circuitry carried on the semiconductor element is shown in FIg. 4.

What is claimed is:

1. A pressure-sensing transducer comprising:
   a housing providing duct-connecting means and defining a chamber having one larger open end adjacent an end of the housing and its other smaller end interiorly of the housing, said housing generally concentric of an axis, and a passageway of relatively small diameter connecting the small end of the chamber and said duct-connecting means;
   a cup member of non-conducting material having an outer peripheral surface conforming to a substantial surface portion of the chamber adjacent its large end and defining a central cup-shaped cavity extending inwardly of the member away from said small end of the chamber to the bottom of the cavity;
   a generally cylindrical transducer unit containing a semi-conductor element seated with one end on a seating surface provided at the bottom of said cavity and extending outwardly thereof into said chamber at clearance with any side surfaces thereof;
   a ring of resilient non-conductive material encircling said unit with its inner surface in sealed frictional engagement with the outer cylindrical surface of the element, and an outer annular surface portion of the ring being in resilient engagement with annular surface portions of said cavity and said chamber to confine the ring in a fixed axial position;
   circuit connectors for said element extending through said member from said open end into an electrical connection with said element; and
   said housing having means for securing said member in fixed position within said chamber.

2. The transducer of claim 1 comprising:
   a viscous flow-resistant, electrically non-conductive liquid filling said passageway and any portion of said chamber contiguous therewith not occupied by said unit and said ring.

3. The transducer of claim 1 wherein:
   said housing has a flange adjacent said larger end of the chamber turned inwardly over, and engaging, an end surface of said member.

4. The transducer of claim 1 wherein:
   said peripheral surface and said surface portion of the chamber comprise confronting areas which are approximately perpendicular to said axis.

5. The transducer of claim 4 wherein:
   said areas are annular and engaged, and said housing comprises a flange at said large end of said chamber turned inwardly onto the end surface of said member.

6. The transducer of claim 2 wherein:
   said liquid is a silicone fluid.

7. The transducer of claim 1 wherein:
   said element has a radial flange adjacent its end nearer the large end of the chamber and said flange is engaged by said ring.

* * * * *